March 29, 1932.
R. C. MUNGER
1,851,370
FISHHOOK RELEASER
Filed Aug. 4, 1930
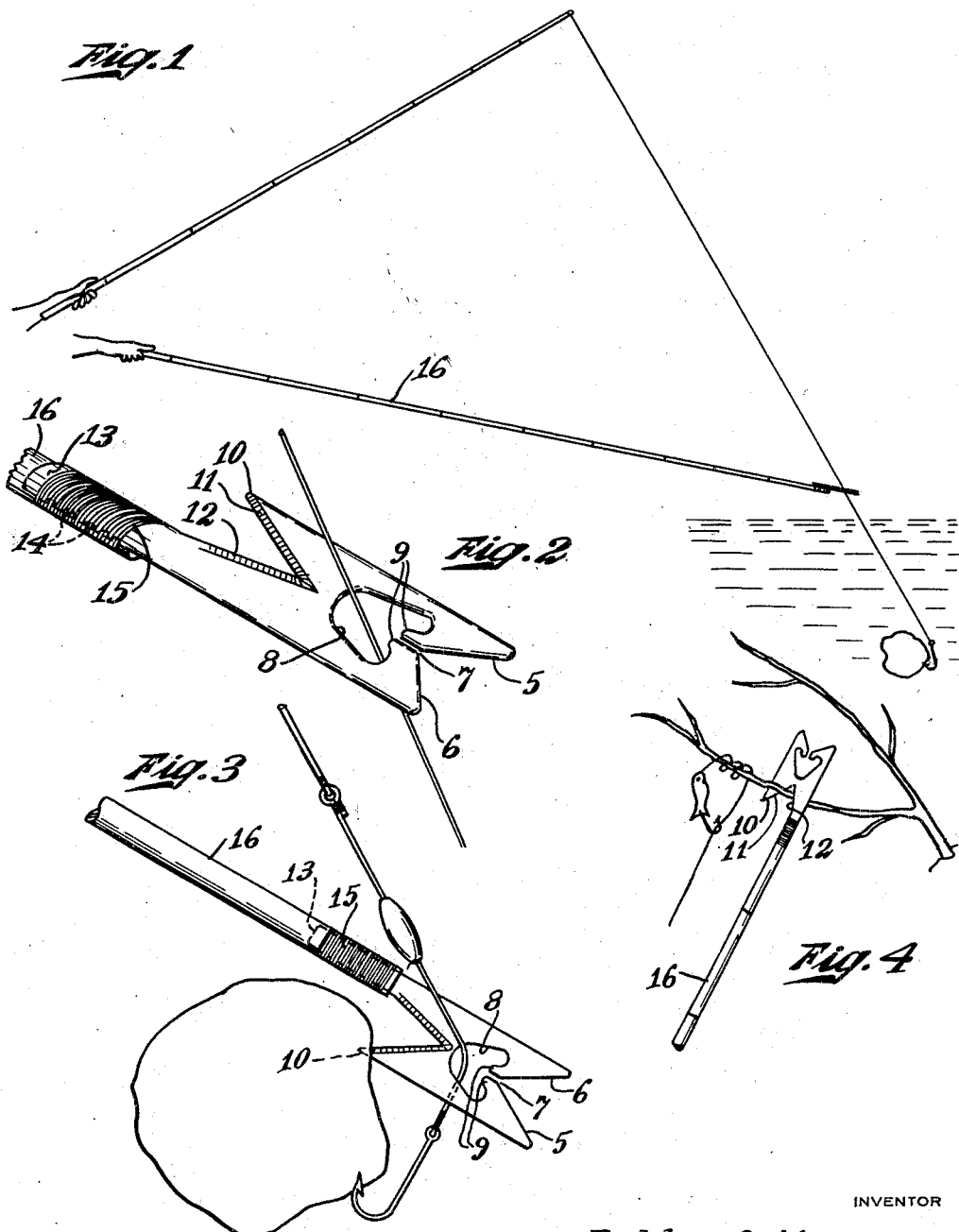
INVENTOR
Robley C. Munger
WITNESS
Charles H. Bassett
BY
ATTORNEYS Patented Mar. 29, 1932

1,851,370

UNITED STATES PATENT OFFICE

ROBLEY C. MUNGER, OF BIRMINGHAM, ALABAMA

FISHHOOK RELEASER

Application filed August 4, 1930. Serial No. 473,060.

My invention relates to a device for releasing fish hooks and in its broadest aspect contemplates the provision of a yoke-like element adapted for attachment to the end of a long pole or rod so that it can be readily caused to engage and follow the line down to the hook and to have sufficient hold on the line to push, laterally shift, or twist the latter in any manner required to disengage the hook.

It is contemplated that my device will be mounted on the end of a bamboo pole or a screw jointed sectional rod which will provide a light but substantially rigid mounting to enable the device to be held in one hand and rigidly thrust forward or shifted laterally or turned as occasion may require to disengage the hook from snags, trees or bushes.

A further distinctive feature of my invention lies in the designing of the yoke-like member so as to provide at the base of the yoke a contracted opening into an enlarged opening in which the line is adapted to be received when engaged by the device and which holds the line positively against disengagement when the device is shifted laterally or twisted yet leaves the device free to be readily disengaged from the line by a downward movement such as is not employed in connection with releasing the hook.

My invention further contemplates mounting the yoke member so as to overhang on one side of the shank by means of which it is adapted to be attached to a pole or rod and I take advantage of this overhang to provide a hook by which limbs, rocks or snags may be caught and pulled when necessary to release the hook therefrom.

A further distinctive feature consists in providing the hook with a guarded knife edge, preferably V-shaped and facing oppositely to the line engaging yoke, which knife edge will act to cut small branches of trees or limbs of snags when the hook cannot be otherwise disengaged therefrom.

My invention further comprises the novel details of construction and arrangements of parts, which in their preferred embodiment only are illustrated in the accompanying drawings which form a part of this specification, and in which:—

Fig. 1 is a view showing one manner of using my improved type of hook releaser,

Fig. 2 is a detail perspective view enlarged of the fish hook releaser in the same relation to the line as shown in Fig. 1.

Fig. 3 is a view showing the hook end of the releaser in service; and

Fig. 4 shows the cutter portion of the releaser in the act of cutting a branch to release the hook caught thereon.

Similar reference numerals refer to similar parts throughout the drawings.

In the embodiment of my invention illustrated, I show my improved fish hook releasing device as formed of a metal plate stamped to provide at its forward or front end a V-shaped yoke refined between the inclined edges 5 and 6, which terminate at a contracted neck 7 giving access to an enlarged opening 8 which is at its forward end on each side of the opening cut away to leave the points 9 projecting inwardly into the opening 8. The side walls of the opening 8 and neck 7 and the edges 5 and 6 are all smooth or rounded so that they will not cut or wear the line when in contact therewith.

At the opposite end of the plate I form a hook 10 and preferably this hook has its inner edge 11 straight and sharpened so as to form with an opposite sharpened edge 12 a V-shaped knife edge, by means of which limbs or snags may be cut.

At one corner of the hook end of the device I provide a shank extension 13 which is grooved and notched transversely as at 14 to receive and hold a cord 15 by which the shank can be readily tied to the end of a bamboo fishing pole 16, as shown in Fig. 1, or to any suitable screw jointed sectional pole.

In utilizing my invention, having mounted it on a rod or pole, when a hook is caught the yoke end is caused readily to engage the line and its bite will draw the line down through the neck 7 into the opening 8. When thus engaged with the line so long as the line is held taut and the hook ends which project beyond the line stand above the line, the latter is firmly engaged in the opening 8 and no twisting or lateral or forward thrusting or other motion that may be necessary to be imparted to the line to disengage the hook will disengage it from the opening 8. The device however, can be readily disengaged from the line by deflecting the free end of the yoke below the line, whereupon the V-edges 5 and 6 of the yoke will engage and draw the line into position to pass out through the neck 7 and thus be disengaged from the hook releaser.

When the hook is caught in a tree, snag or rock so that it cannot be readily disengaged by any pushing or lateral movements of the releaser, the hook end of the latter can be brought into play to roll a log or rock over, or to pull down a large limb, or its knife edge may be employed to cut the small snag or light limbs of trees. Thus the device is applicable for all purposes incidental to releasing a hook whether caught in a snag or tree and will effectually safeguard against the loss of the hooks or lures.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. A fish hook releaser comprising a yoke-like member having an opening cut out of its body portion and connected with the neck of the yoke by a contracted throat.

2. A fish hook releaser comprising a yoke-like member having an opening cut out of its body portion and connected with the neck of the yoke by a contracted throat which projects into the opening to deflect a line passing through the opening from accidental escape therefrom through said throat.

3. A fish hook releaser comprising a flat plate having at one end a shank and having at its other end an incut notch forming a yoke, there being in the body of the plate an enlarged opening connected by a contracted throat with the apex of the notch, the throat being large enough to permit the line to pass therethrough into the opening, the forward edges of the opening being shaped to guide the line away from the throat.

In testimony whereof I affix my signature.

ROBLEY C. MUNGER.